United States Patent
Valente et al.

(10) Patent No.: US 9,079,495 B2
(45) Date of Patent: Jul. 14, 2015

(54) DISCONNECTABLE DRIVELINE WITH A MULTI-SPEED RDM AND PTU

(71) Applicant: American Axle & Manufacturing, Inc., Detroit, MI (US)

(72) Inventors: Paul J. Valente, Berkley, MI (US); James P. Downs, South Lyon, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 210 days.

(21) Appl. No.: 13/916,952

(22) Filed: Jun. 13, 2013

(65) Prior Publication Data

US 2013/0337960 A1 Dec. 19, 2013

Related U.S. Application Data

(60) Provisional application No. 61/660,063, filed on Jun. 15, 2012.

(51) Int. Cl.
*F16H 48/06* (2006.01)
*B60K 23/08* (2006.01)
*B60K 17/35* (2006.01)
*B60K 17/346* (2006.01)

(52) U.S. Cl.
CPC .............. *B60K 23/08* (2013.01); *B60K 17/3462* (2013.01); *B60K 17/35* (2013.01)

(58) Field of Classification Search
None
See application file for complete search history.

(56) References Cited

U.S. PATENT DOCUMENTS

| | | |
|---|---|---|
| 1,362,361 A | 12/1920 | Starr |
| 2,783,661 A | 3/1957 | Dryer |
| 3,749,217 A | 7/1973 | Bush et al. |
| 4,407,387 A | 10/1983 | Lindbert |
| 4,763,749 A | 8/1988 | Miura et al. |
| 4,774,857 A | 10/1988 | Heine et al. |
| 4,875,978 A | 10/1989 | Hiketa |
| 4,915,190 A | 4/1990 | Iwata |
| 4,938,306 A | 7/1990 | Sumiyoshi et al. |
| 4,995,862 A * | 2/1991 | Arocha ........................... 475/86 |
| 5,041,069 A | 8/1991 | Horst |
| 5,061,229 A | 10/1991 | Tsukamoto et al. |
| 5,065,639 A | 11/1991 | Flanhardt et al. |
| 5,069,305 A | 12/1991 | Kobayashi |
| 5,083,986 A | 1/1992 | Teraoka et al. |
| 5,105,901 A | 4/1992 | Watanabe et al. |
| 5,105,902 A | 4/1992 | Wilson et al. |
| 5,156,247 A | 10/1992 | Wiese et al. |
| 5,174,408 A | 12/1992 | Hock |
| 5,188,194 A | 2/1993 | Gasch |
| 5,234,072 A | 8/1993 | Chludek |
| 5,314,039 A | 5/1994 | Hock |
| 5,411,110 A | 5/1995 | Wilson et al. |
| 5,423,235 A | 6/1995 | Botterill et al. |
| 5,484,033 A | 1/1996 | Frank et al. |
| 5,547,430 A | 8/1996 | Gasch |

(Continued)

FOREIGN PATENT DOCUMENTS

| GB | 2407804 B | 9/2006 |
|---|---|---|
| KR | 2019990020807 U | 6/1999 |

(Continued)

*Primary Examiner* — Dirk Wright
(74) *Attorney, Agent, or Firm* — Harness, Dickey & Pierce, P.L.C.

(57) ABSTRACT

A disconnectable all-wheel drive system for motor vehicles having a multi-speed power take-off unit and a multi-speed rear drive module.

21 Claims, 10 Drawing Sheets

(56) References Cited

U.S. PATENT DOCUMENTS

| | | | |
|---|---|---|---|
| 5,562,566 | A | 10/1996 | Yang |
| 5,599,249 | A | 2/1997 | Zalewski et al. |
| 5,632,185 | A | 5/1997 | Gassmann |
| 5,690,201 | A | 11/1997 | Gassmann |
| 5,706,923 | A | 1/1998 | Gassmann |
| 5,839,986 | A | 11/1998 | Yamazaki |
| 5,888,165 | A * | 3/1999 | Besler et al. ............... 475/204 |
| 5,935,036 | A | 8/1999 | Gassmann et al. |
| 5,951,428 | A | 9/1999 | Itoh et al. |
| 6,113,512 | A | 9/2000 | Williams |
| 6,116,392 | A | 9/2000 | Gassmann |
| 6,186,258 | B1 | 2/2001 | Deutschel et al. |
| 6,209,673 | B1 | 4/2001 | Barlage et al. |
| 6,241,067 | B1 | 6/2001 | Hock |
| 6,263,995 | B1 | 7/2001 | Watson et al. |
| 6,267,214 | B1 | 7/2001 | Kwoka |
| 6,431,337 | B1 | 8/2002 | Hock et al. |
| 6,443,282 | B1 | 9/2002 | Kwoka |
| 6,446,773 | B2 | 9/2002 | Kwoka |
| 6,461,267 | B1 | 10/2002 | Paielli |
| 6,520,885 | B2 | 2/2003 | Gassmann et al. |
| 6,533,090 | B2 | 3/2003 | Osborn et al. |
| 6,547,025 | B1 | 4/2003 | Gassmann et al. |
| 6,557,677 | B2 | 5/2003 | Peura |
| 6,592,487 | B2 | 7/2003 | Gassmann |
| 6,769,506 | B2 | 8/2004 | Gassmann et al. |
| 6,779,420 | B2 | 8/2004 | Peura |
| 6,805,653 | B2 | 10/2004 | Krzesicki et al. |
| 6,814,682 | B2 | 11/2004 | Spitale |
| 6,827,663 | B2 | 12/2004 | Tucker-Peake |
| 6,849,017 | B2 | 2/2005 | Nett |
| 6,851,501 | B2 | 2/2005 | Gassmann |
| 6,935,981 | B2 | 8/2005 | Nishiji |
| 6,945,899 | B2 | 9/2005 | Peura |
| 6,968,756 | B2 | 11/2005 | Folino et al. |
| 6,974,400 | B2 | 12/2005 | Williams |
| 7,094,172 | B2 | 8/2006 | Ishikawa |
| 7,150,694 | B2 | 12/2006 | Mizon et al. |
| 7,207,409 | B2 | 4/2007 | Downs |
| 7,331,896 | B1 | 2/2008 | Kroppe |
| 7,416,505 | B2 | 8/2008 | Downs |
| 7,452,301 | B2 | 11/2008 | Yoshioka |
| 7,533,754 | B2 | 5/2009 | Burrows et al. |
| 8,042,642 | B2 | 10/2011 | Marsh et al. |
| 8,047,323 | B2 | 11/2011 | Downs et al. |
| 8,215,440 | B2 | 7/2012 | Hoffmann et al. |
| 2002/0032096 | A1 | 3/2002 | Gassmann |
| 2002/0088291 | A1 | 7/2002 | Bowen |
| 2003/0089185 | A1 | 5/2003 | Hock et al. |
| 2005/0023063 | A1 | 2/2005 | Mueller |
| 2006/0283654 | A1 | 12/2006 | Krisher |
| 2007/0105687 | A1 * | 5/2007 | Lovell et al. ............... 475/332 |
| 2007/0289797 | A1 | 12/2007 | Bowen |
| 2008/0128234 | A1 | 6/2008 | Mogami et al. |
| 2008/0227582 | A1 | 9/2008 | Peura |
| 2009/0160274 | A1 | 6/2009 | Aikawa et al. |
| 2010/0216593 | A1 | 8/2010 | Ekonen et al. |
| 2011/0105265 | A1 * | 5/2011 | Yoshimura ............... 475/205 |
| 2011/0275470 | A1 | 11/2011 | Ekonen et al. |
| 2011/0319213 | A1 | 12/2011 | Ekonen et al. |
| 2012/0029779 | A1 | 2/2012 | Dickinson et al. |
| 2012/0073929 | A1 | 3/2012 | Grutter et al. |
| 2012/0083380 | A1 | 4/2012 | Reed et al. |

FOREIGN PATENT DOCUMENTS

| | | |
|---|---|---|
| KR | 100274035 B1 | 12/2000 |
| KR | 100291087 B1 | 3/2001 |
| KR | 100483163 B1 | 4/2005 |
| WO | WO-2010104853 A2 | 9/2010 |

* cited by examiner

FIG. 9

DISCONNECTABLE DRIVELINE WITH A MULTI-SPEED RDM AND PTU

CROSS-REFERENCE TO RELATED APPLICATIONS

This application claims the benefit of U.S. Provisional Patent Application No. 61/660,063 entitled "DISCONNECTABLE DRIVELINE WITH A TWO-SPEED RDM AND PTU" filed Jun. 15, 2012, the disclosure of which is incorporated by reference as if fully set forth herein in its entirety.

FIELD

The present disclosure relates generally to all-wheel drive vehicles and more particularly to multi-speed disconnectable drivelines for all-wheel drive vehicles.

BACKGROUND

This section provides background information related to the present disclosure which is not necessarily prior art.

Many modern automotive vehicles, such as crossover vehicles, are available with an all-wheel drive (AWD) drivetrain that is based on a front-wheel drive (FWD) architecture. This optional drivetrain arrangement permits drive torque to be selectively and/or automatically transferred from the powertrain to both the primary (i.e., front) driveline and the secondary (i.e., rear) driveline to provide better traction when the vehicle is operated in inclement weather and on off-highway road conditions. Such AWD vehicles necessarily are equipped with a much more complex drivetrain which, in addition to the primary driveline, must include the additional components associated with the secondary driveline such as a power take-off unit and a propshaft.

In an effort to minimize driveline losses (i.e., viscous drag, friction, inertia and oil churning) associated with secondary driveline being back-driven when no drive torque is transmitted thereto, it is known to incorporate a disconnect system that is configured to uncouple components of the secondary driveline such as, for example, the rear wheels or the rear differential from the remainder of the secondary driveline. To this end, there remains a need in the art for development of improved disconnectable drivelines for use in AWD vehicles.

SUMMARY

It is an aspect of the present teachings to provide a disconnectable secondary driveline arrangement for use with all-wheel drive vehicles that includes a multi-speed power take-off unit, a multi-speed rear drive module, and a control system for controlling coordinated actuation of the multi-speed power take-off unit and the multi-speed rear drive module.

In accordance with these and other aspects of the present teachings, an all-wheel drive vehicle can include a powertrain, a primary driveline, a power take-off unit, a secondary driveline, and a control system. The powertrain can include a prime mover and a transmission having an output. The primary driveline is driven by the transmission output and is operable to direct rotary power from the prime mover through the power take-off unit to a first differential for driving a pair of first vehicle wheels. The power take-off unit is operable under the control of the control system in one of a disconnected mode and a connected mode. The power take-off unit is operable in its connected mode to direct rotary power from the transmission output to the secondary driveline. The secondary driveline can include a rear drive module and a propshaft that couples an output of the power take-off unit to an input of the rear drive module. The rear drive module can include a second differential interconnecting a pair of second axleshafts to a pair of second vehicle wheels, and at least one torque transfer device operably disposed between the input and the second differential. The torque transfer device is operable under the control of the control system in one of a disconnected mode and a connected mode. The torque transfer device is operable in its connected mode to direct rotary power transmitted by the power take-off unit to the second differential. When the power take-off unit and the torque transfer device are in their disconnected modes, rotary power is only transmitted to the first vehicle wheels. The torque transfer device is operable in its disconnected mode to prevent the second vehicle wheels and the second differential from back-driving the input of the rear drive module, the propshaft, and the output of the power take-off unit. The power take-off unit is operable in its disconnected mode to prevent the transmission output from driving the propshaft.

In addition to the above, an all-wheel drive vehicle of the present teachings can also include a multi-speed power take-off unit and a multi-speed rear drive module. The power take-off unit is still operable in its disconnected and connected modes but further includes a multi-speed range unit that is operably disposed between the transmission output and the first differential. The multi-speed range unit is configured to establish two distinct speed ratio drive connections between the transmission output and the first differential. Pursuant to one embodiment, the power take-off unit equipped with the multi-speed range unit is capable of establishing a two-wheel high-range drive connection, a four-wheel high-range drive connection, and a four-wheel low-range drive connection between the transmission output and the first differential. The rear drive module is still operable in its disconnected and connected modes but further includes a multi-speed range unit that is operably disposed between the input and the second differential. The multi-speed range unit is configured to establish two distinct speed ratio drive connections between the input and the second differential. Pursuant to one embodiment, the rear drive module is capable of establishing a high-range drive connection and a low-range drive connection between the input and the second differential. The control system is operable to coordinate actuation of the multi-speed power switching mechanism and the multi-speed rear drive module.

In accordance with other aspects of the present teachings, the power take-off unit equipped with a multi-speed range unit is capable of establishing a high-range drive connection and an overdrive connection between the transmission output and the first differential. Similarly, the rear drive module equipped with a multi-speed range unit is capable of establishing a high-range drive connection and an overdrive connection between the input and the second differential. Thus, the multi-speed range units associated with both the power take-off unit and the rear drive module can be configured to provide either a reduction speed ratio or an overdrive speed ratio drive connection in addition to a direct (high-range) ratio drive connection.

Further areas of applicability will become apparent from the description and claims herein. The description and specific examples in this summary are intended for purposes of illustration only and are not intended to limit the scope of the present disclosure.

DRAWINGS

The drawings described herein are for illustrative purposes only of selected embodiments and are not intended to limit the scope of the present disclosure in any way. Similar or identical elements are given consistent reference numerals throughout the various figures.

The present disclosure will become more fully understood from the detailed description and the accompanying drawings wherein.

DETAILED DESCRIPTION

The following exemplary embodiments are provided so that the present disclosure will be thorough and fully convey the scope to those skilled in the art. Numerous specific details are set forth such as examples of specific components, devices and schematic configurations to provide a thorough understanding of exemplary embodiments of the present disclosure. However, it will be apparent to those skilled in the art that these specific details need not be employed, that the exemplary embodiments may be embodied in many different forms, and that neither should be construed to limit the scope of the present disclosure.

Figure 1:
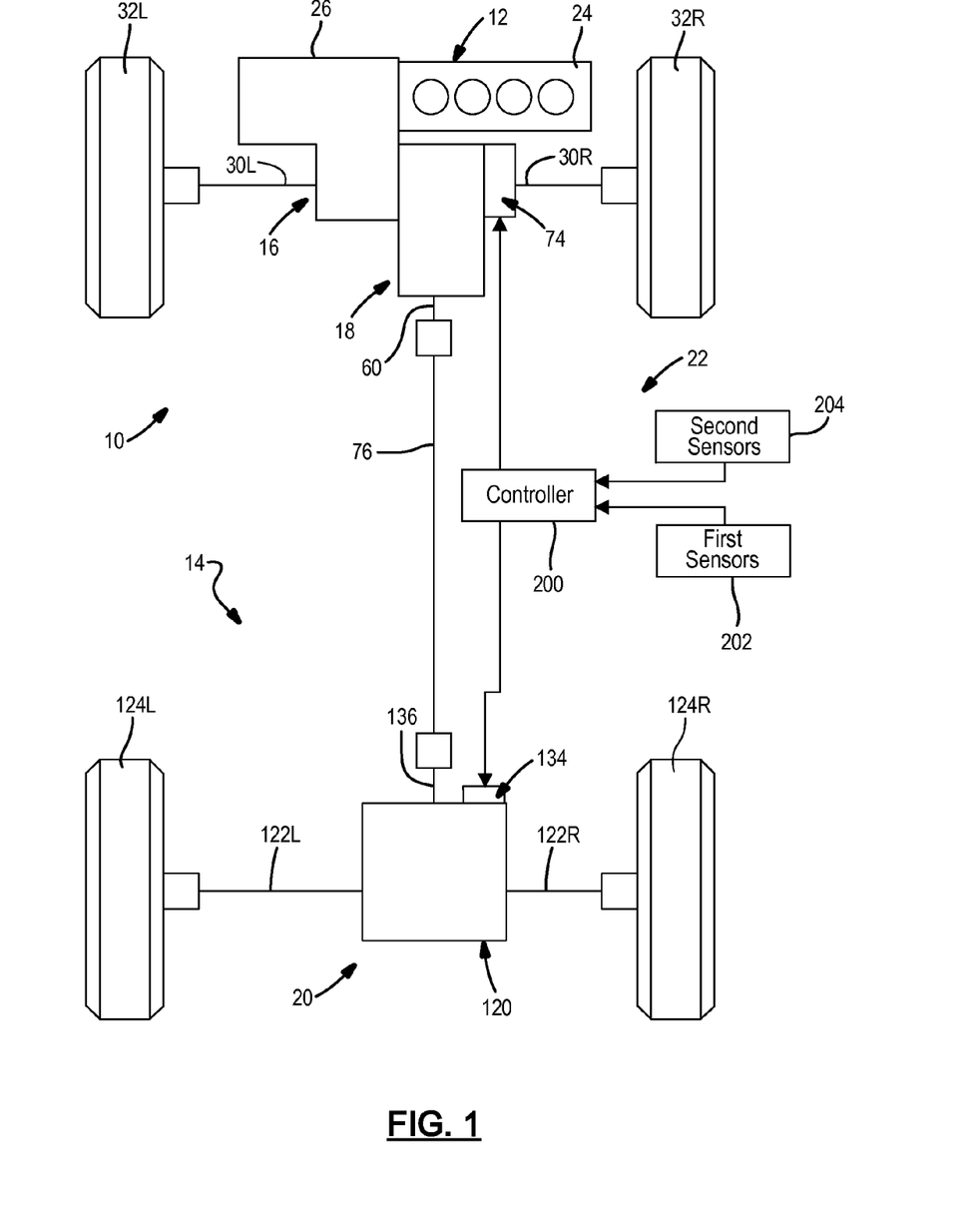
FIG. 1 is a schematic of a motor vehicle equipped with a disconnectable all-wheel drive system constructed in accordance with the present teachings.

With reference to FIG. 1 of the drawings, a motor vehicle constructed in accordance with the teachings of the present disclosure is schematically shown and generally indicated by reference numeral 10. The motor vehicle 10 can include a powertrain 12 and a drivetrain 14 that can include a primary driveline 16, a power switching mechanism 18, a secondary driveline 20, and a control system 22. In accordance with various aspects of the present teachings, the primary driveline 16 can be a front driveline while the secondary driveline 20 can be a rear driveline.

The powertrain 12 can include a prime mover 24, such as an internal combustion engine or an electric motor, and a transmission 26 which can be any type of ratio-changing mechanism, such as a manual, automatic, or continuously variable transmission. The prime mover 24 is operable to provide rotary power to the primary driveline 16 and the power switching mechanism 18.

Figure 2:
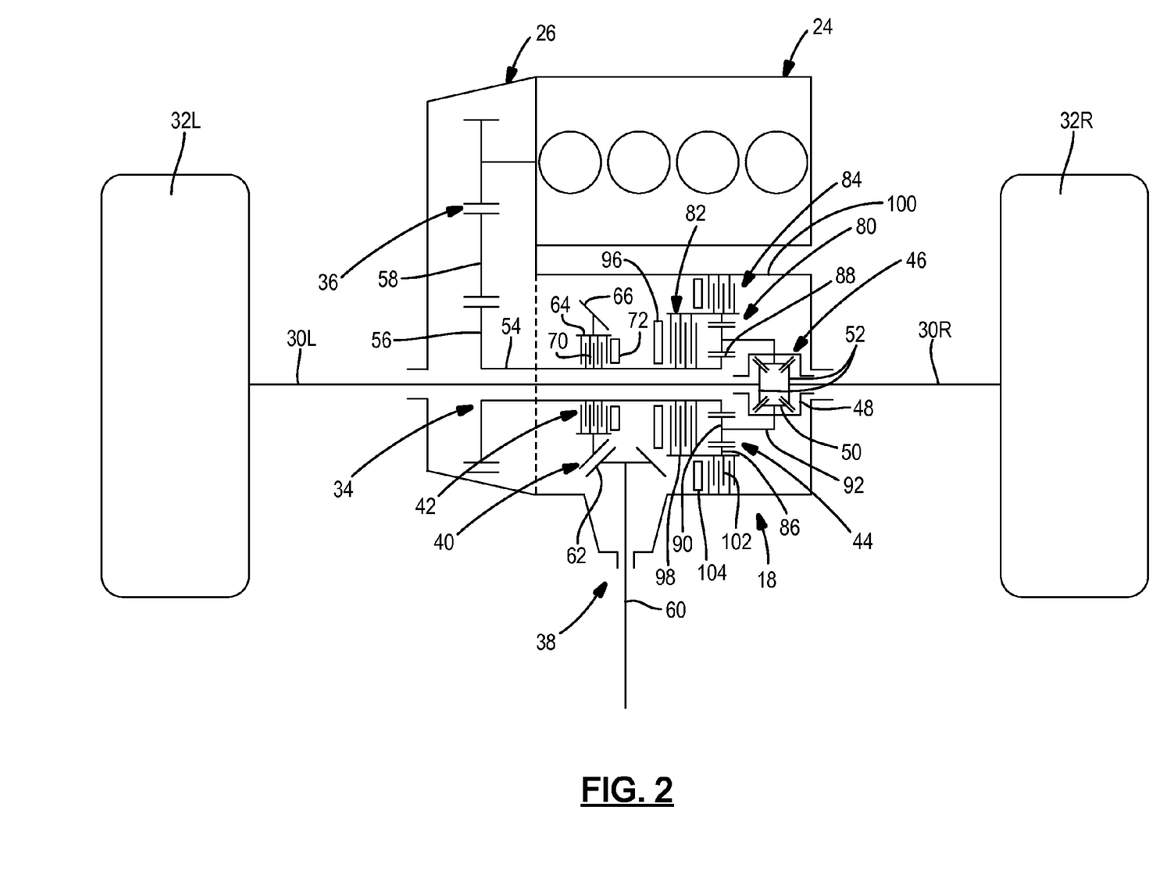
FIGS. 2 and 2A are schematic illustrations of the powertrain and primary driveline associated with the disconnectable all-wheel drive system of FIG. 1 which is equipped with a multi-speed power take-off unit.

With additional reference to FIG. 2, the primary driveline 16 can include a pair of first axleshafts 30L, 30R which drive a pair of first vehicle wheels 32L, 32R. The power switching mechanism 18, hereinafter referred to as a power take-off unit (PTU), can include a PTU input 34 adapted to be driven by an output 36 of the transmission 26, a PTU output 38, a transfer gear assembly 40, a disconnect mechanism 42, a multi-speed range unit 44, and a first differential 46. The first differential 46 is a bevel-type gearset having a first differential case 48 driving a pair of first pinion gears 50, and a pair of first side gears 52 driven by the first pinion gears 50 and which are connected to the inboard ends of the first axleshafts 30L, 30R. The PTU input 34 can include a tubular input shaft 54 concentrically surrounding a portion of first axleshaft 30L and having an input gear 56 meshed with and driven by a transmission output gearset 58. The PTU output 38 can include an output pinion shaft 60 having a pinion gear 62. The transfer gear assembly 40 can include a hollow transfer shaft 64 surrounding a portion of the input shaft 54 and a hypoid gear 66 that is fixed for rotation with the transfer shaft 64 and in constant mesh with pinion gear 62.

The disconnect mechanism 42 is a multi-plate friction clutch assembly that can be selectively actuated to releasably couple the transfer shaft 64 to the input shaft 54 for transmitting rotary power from the powertrain 12 to the secondary driveline 20. The disconnect clutch assembly 42 includes a clutch pack 70 of interleaved inner and outer friction plates coupled respectively to the input shaft 54 and the transfer shaft 64, and a disconnect actuator 72 configured to generate and exert a clutch engagement force on the clutch pack 70. Disconnect actuator 72 can include a hydraulically-operated disconnect piston that is disposed for sliding movement within a disconnect pressure chamber. FIG. 1 schematically discloses a hydraulic power pack 74 that is operable to control the hydraulic pressure supplied to the disconnect pressure chamber for regulating the clutch engagement force applied to the clutch pack 70 by the disconnect piston in response to control signals from the control system 22. While only shown schematically, it is understood that the hydraulic powerpack 74 can include all components required to generate and supply pressurized fluid between the disconnect pressure chamber and a fluid reservoir and can include a fluid pump and required electrically-controlled valving for this purpose.

The disconnect mechanism 42 is operable in a first of "disconnected" mode to release the clutch engagement force applied to the clutch pack 70 such that the input shaft 54 is disconnected from driven engagement with the transfer shaft 64. Thus, no rotary power is transmitted from the powertrain 12 to the output pinion shaft 60. The disconnect mechanism 42 is further operable in a second or "connected" mode wherein a sufficient clutch engagement force is generated and applied to the clutch pack 70 by the disconnect piston to cause the transfer shaft 64 to be rotatively driven by the input shaft 54. Thus, rotary power is transmitted from the powertrain 12 to the output pinion shaft 60. As will be detailed, the output pinion shaft 60 is coupled via a propshaft 76 to the secondary driveline 20.

With continued reference to FIG. 2, the multi-speed range unit 44 can include an epicyclic planetary gear assembly 80, a first or "high" range clutch 82, and a second or "low" range clutch 84. The planetary gear assembly 80 can include a ring gear 86, a sun gear 88, and planet gears 90 that are meshed with both the ring gear 86 and the sun gear 88. The planet gears 90 are rotatably supported from a planet carrier 92 that is fixed to, or integrally formed with, the first differential case 48 of the first differential 46 for common rotation therewith. The sun gear 88 is fixed for common rotation with the input shaft 54.

The first range clutch 82 is operably disposed between the sun gear 88 and the ring gear 86 and includes a high-range clutch pack 94 and a high-range actuator 96. The high-range clutch pack 94 includes interleaved inner and outer friction plates fixedly coupled respectively to the sun gear 88 (or the input shaft 54) and a clutch drum 98 that is fixed to the ring gear 86. The high-range actuator 96 is configured to generate and exert a clutch engagement force for use in conjunction with the release of the high-range clutch pack 94. High-range actuator 96 can include a spring-applied device (not shown) for normally engaging the clutch pack 94, and a hydraulically-operated piston disposed for sliding movement in a high-range pressure chamber. The hydraulic powerpack 74 (FIG. 1) is configured to control the hydraulic pressure supplied to the high-range pressure chamber for regulating the magnitude of the clutch engagement force in response to control signals from the control system 22. The range clutch 82 is normally-closed (via the spring-applied device) for frictionally engaging the high-range clutch pack 94 and effectively coupling the ring gear 86 for rotation with the sun gear 88 so as to establish a first or "engaged" mode. This connection between the sun gear 88 and the ring gear 86 through the spring loaded high-range clutch pack 94 can be selectively released to establish a second or "disengaged" mode by causing the high-range actuator 96 to exert the clutch engagement force on the spring-applied device so as to release the clutch pack 94 and permit the sun gear 88 to rotate relative to the ring gear 86.

The second range clutch 84 is operably disposed between the ring gear 86 and a stationary portion of a PTU housing 100 and includes a low-range clutch pack 102 and a low-range actuator 104. The low-range clutch pack 102 includes alternatively interleaved inner and outer friction plates fixedly coupled respectively to the clutch drum 98 fixed to the ring gear 86 and a non-rotary portion of PTU housing 100. The low-range actuator 104 is configured to generate and exert a clutch engagement force on the low-range clutch pack 102 to shift between a first or "disengaged" mode and a second or "engaged" mode. The low-range actuator 104 can include a hydraulically-operated piston disposed for sliding movement in a low-range pressure chamber. The hydraulic powerpack 74 is again configured to control the hydraulic pressure supplied to the low-range pressure chamber in response to control signals from the control system 22. With the second range clutch 84 operating in its first mode, the ring gear 86 is permitted to rotate. In contrast, with the second range clutch 84 operating in its second mode, the ring gear 86 is braked against rotation.

The multi-speed range unit 44 is operable to establish two different speed ratio drive connections between the input shaft 54 and the first differential case 48. Specifically, a first or direct drive connection is established when the first range clutch 82 is operating in its first ("engaged") mode and the second range clutch 84 is operating in its first ("disengaged") mode. As such, the sun gear 88 and the ring gear 86 are coupled for common rotation which, in turn causes the planet carrier 92 to be driven at a common speed with the input shaft 54. This direct drive connection between the input shaft 54 and the second differential case 48 is commonly referred to as the high-range and establishes a 1:1 speed ratio. A second or reduction ratio drive connection is established when the first range clutch 82 is operating in its second ("disengaged") mode and the second range clutch 84 is operating in its second ("engaged") mode. Accordingly, ring gear 86 is held against rotation and subsequent rotation of the sun gear 88 (via the input shaft 54) causes the planet carrier 92 to rotate at a reduced speed ratio (also referred to as an underdrive ratio) relative to the input shaft 54. Finally, a third or neutral non-driven mode is established when the first range clutch 82 is operating in its second ("disengaged") mode and the second range clutch 84 is operating in its first ("disengaged") mode. In this neutral mode, the second differential 46 is not driven by the input shaft 54.

Figure 2A:
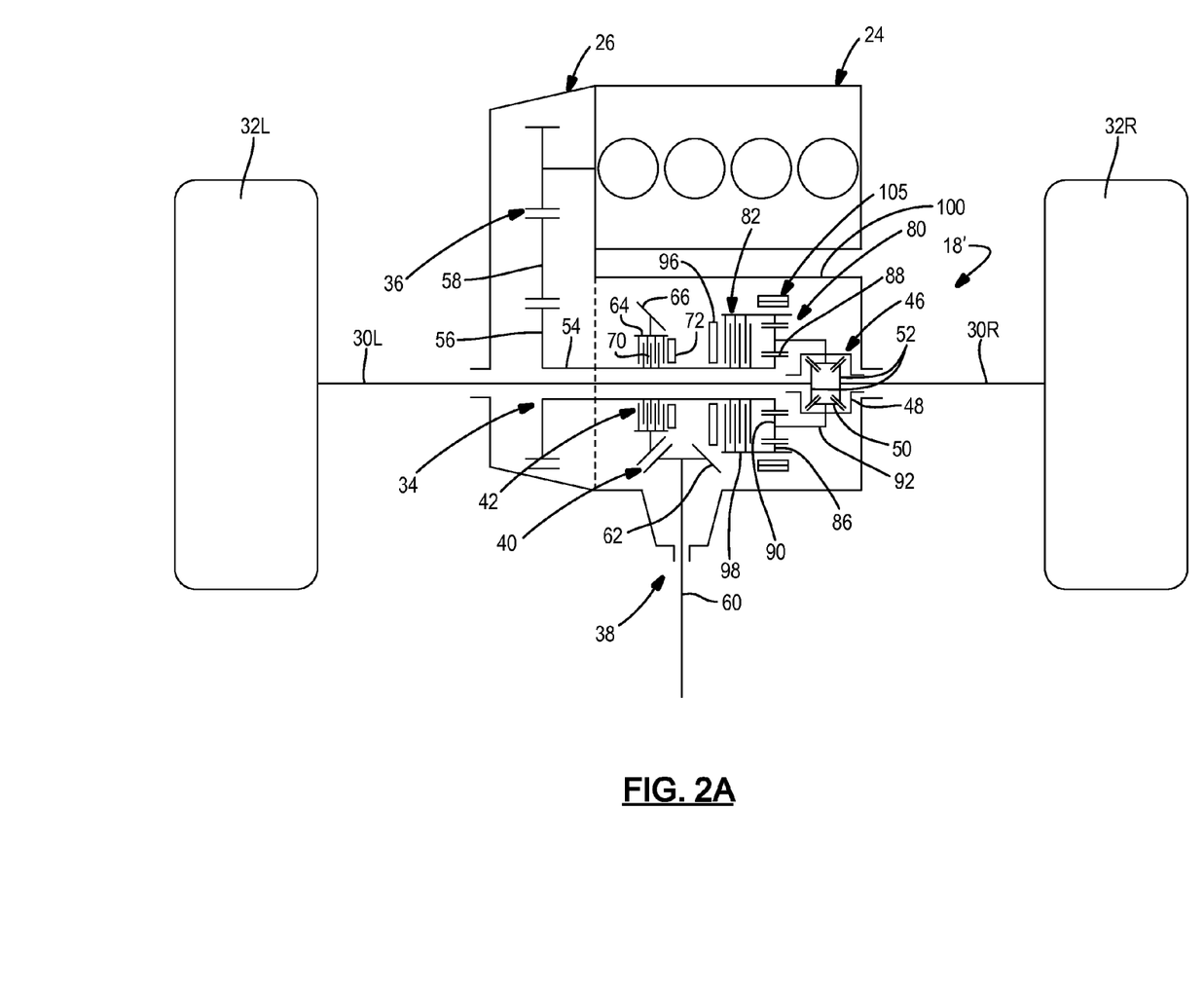

Referring to FIG. 2A, a slightly modified version of the multi-speed PTU 18' is shown. Specifically, PTU 18' is substantially similar to PTU 18 of FIG. 2 except that the second range clutch 84 has been replaced with a brake 105 operably disposed between the ring gear 86 (or the clutch drum 98) and PTU housing 100. The brake 105 can be hydraulically-operated by the hydraulic powerpack 74 in response to control signals from the control system 22 for shifting between its first (disengaged) and second (engaged) modes. In its first mode, brake 105 is released for permitting rotation of the ring gear 86. In its second mode, brake 105 is actuated to prevent rotation of the ring gear 86.

Figure 3:
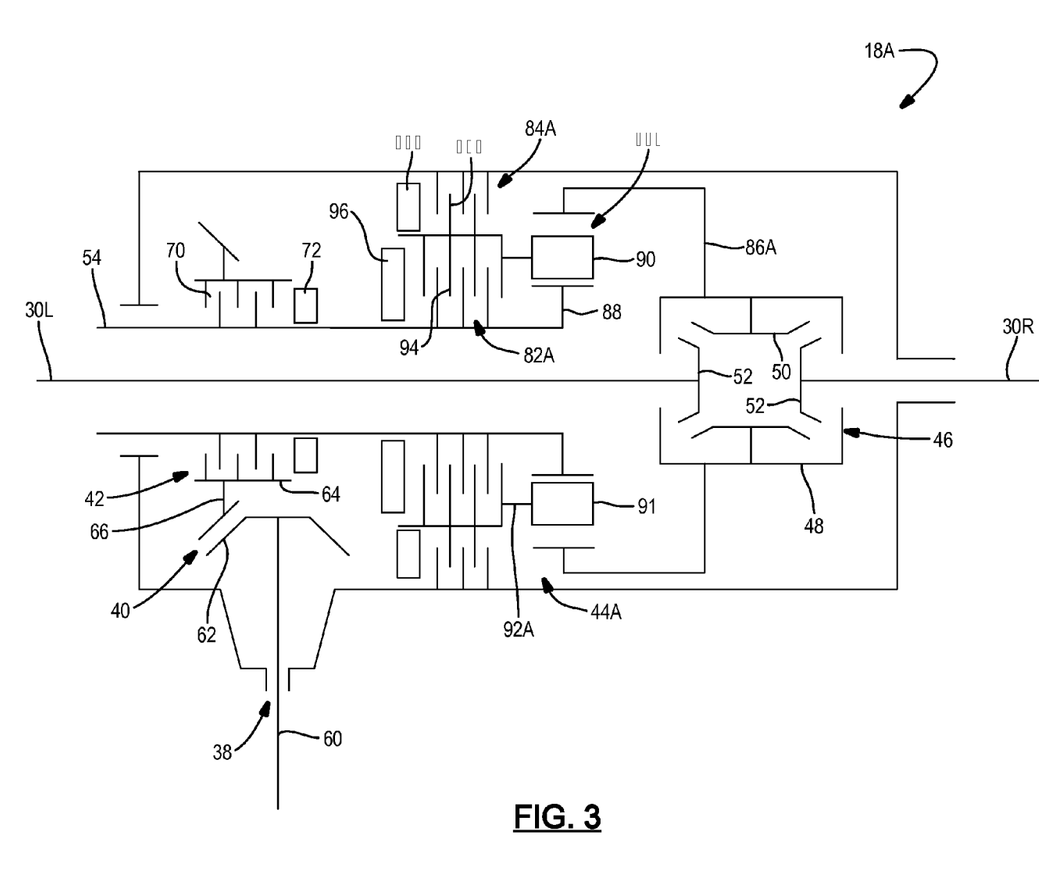
FIG. 3 is a schematic view of an alternative exemplary embodiment of a multi-speed power take-off unit configured for use with the all-wheel drive system of FIG. 1.

Referring to FIG. 3, another modified version of power take-off unit 18 will be described and identified by reference numeral 18A. Power take-off unit 18A is generally similar to power take-off unit 18 with the exception that it incorporates a multi-speed range unit 44A having a different planetary gear assembly 80A. In particular, ring gear 86A is now fixed for rotation with the first differential case 48 of the first differential 46 and a set of second planet gears 91 are also supported by the planet carrier 92A. The first planet gears 90 only mesh with the sun gear 88 while the second planet gears 91 mesh with the first planet gears 90 and the ring gear 86A. Furthermore, the first range clutch 82A is now arranged to normally couple and selectively release a connection between the sun gear 88 and the planet carrier 92A while the second range clutch 84A is now arranged to selectively couple and release a connection between the sun gear 88 and the planet carrier 92A. As before, the first or direct drive connection between the input shaft 54 and the first differential case 48 is established with the first range clutch 82A operating in its first mode and the second range clutch 84A operating in its first mode. Likewise, the reduction ratio drive connection is established when the first range clutch 82A is operating in its second mode and the second range clutch 84A is operating in its second mode. Thus, power take-off units 18 (FIG. 2), 18' (FIG. 2A) and 18A (FIG. 3) are configured to permit selection of a direct (high-range) and a reduction (low-range) ratio drive connection between the input shaft 54 and the first differential 46.

Figure 4:
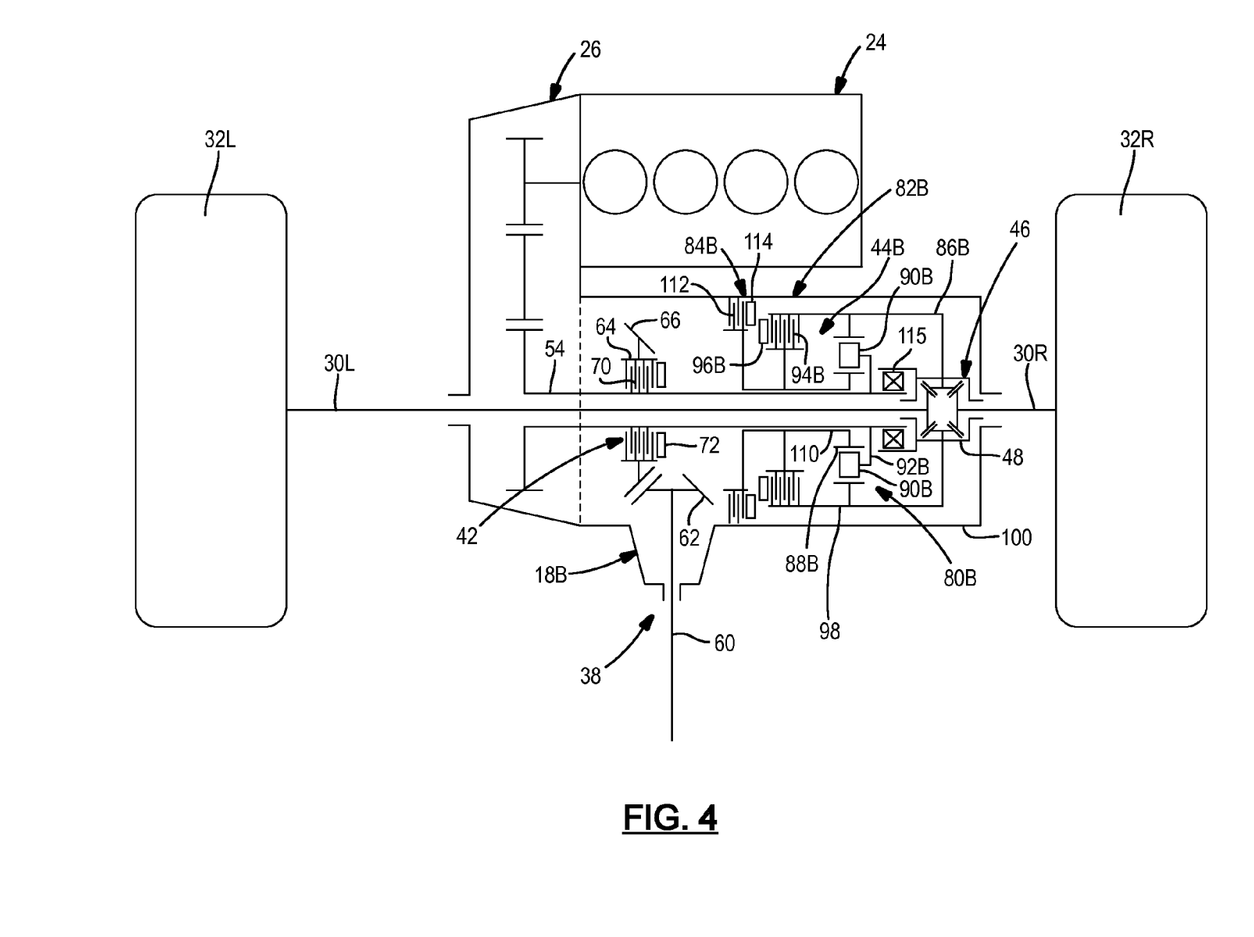
FIGS. 4 and 5 are schematic views of other alternative exemplary embodiments of a multi-speed power take-off unit configured for use with the all-wheel drive system of FIG. 1.

Referring now to FIG. 4, another alternative embodiment of a power take-off unit 18B is shown and which is configured to permit selection of an overdrive ratio drive connection between the input shaft and the first differential instead of a reduction ratio drive connection. Since several similar components are associated with these alternative configurations, common reference numbers are used to identify such similar components.

Power take-off unit 18B can be equipped with a multi-speed range unit 44B having an epicyclic gear assembly 80B, a first range clutch 82B, and a second or overdrive range clutch, hereinafter second range clutch 84B. The planetary gear assembly 80B can include a planet carrier 92B fixed for rotation with the input shaft 52, a ring gear 86B fixed for rotation with the first differential case 48, a sun gear shaft 110 having a sun gear 88B, and planet gears 90B rotatably supported from the carrier 92B and which are meshed with the ring gear 86B and the sun gear 88B.

The first range clutch 82B is operably disposed between the ring gear 86B and the sun gear 88B and includes a high-range clutch pack 94B and a high-range actuator 96B. The clutch pack 94B includes interleaved inner and outer friction plates respectively coupled to the sun gear shaft 110 and the clutch drum 98B that is fixed to the ring gear 86B. The high-range actuator 96B can include a spring-applied device for frictionally engaging the high-range clutch pack 94B and establishing the first or "engaged" mode wherein the sun gear 88B and the ring gear 86B are coupled for common rotation, and a high-range piston. Actuation of the high-range actuator 96B is operable to move the high-range piston for shifting the first range clutch 82B into its second or "disengaged" mode against the biasing of the spring-applied device. As mentioned, the piston of the high-range actuator 96B is moveable in a pressure chamber to release frictional engagement of the clutch pack 94B so as to permit the ring gear 86B to rotate relative to the sun gear 88B.

The second range clutch 84B is operably disposed between the sun gear shaft 110 and a portion of housing 100. The second range clutch 84B includes an overdrive clutch pack 112 and an overdrive actuator 114. The overdrive clutch pack 112 can include a plurality of interleaved inner and outer friction plates coupled between a hub 116 fixed to the sun gear shaft 110 and the housing 100. The overdrive actuator 114 is configured to generate and exert a clutch engagement force on the clutch pack 112 to shift between a first ("disengaged") mode and a second ("engaged") mode. With second range clutch 84B operating in its first mode, the sun gear shaft 110 is permitted to rotate while in its second mode, the sun gear 88B is braked against rotation. It is contemplated that the overdrive actuator 114 can include a hydraulically-operated piston that is supplied with pressurized hydraulic fluid by the powerpack 74 in response to control signals from the control system 22.

As mentioned, the multi-speed range unit 44B is operable to establish a direct ratio and an overdrive ratio connection between the input shaft 54 and the first differential 46. Specifically, the direct drive connection is established when the first range clutch 82B is operating in its first (engaged) mode and the second range clutch 84B is operating in its first (disengaged) mode. As such, the planet carrier 92B drives the ring gear 86B at a common speed. The overdrive connection is established when the first range clutch 82B is operating in its second (disengaged) mode and the second range clutch 84B is operating in its second (engaged) mode. Thus, the sun gear 88B is held against rotation and driven rotation of the carrier 92B (via the input shaft 54) causes the ring gear 86B to be driven at an increased speed relative to the speed of the input shaft 54. It is contemplated that the multi-speed range unit 44B could further include a one-way clutch 115 positioned between the planet carrier 92B and the ring gear 86B to facilitate a smooth "power-on" shift between the high range and overdrive connections.

Figure 5:
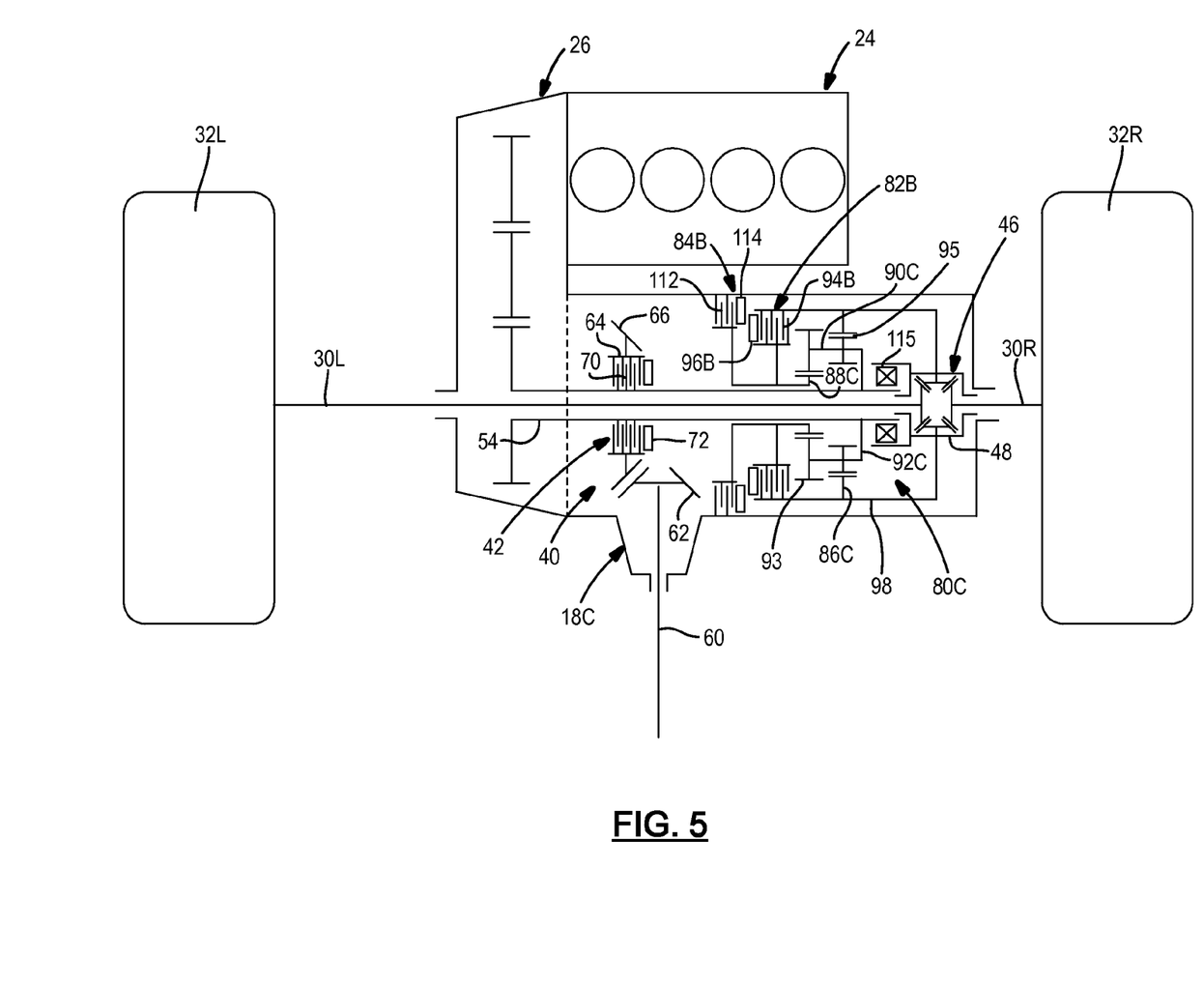

Referring to FIG. 5, another alternative embodiment of the PTU 18C is shown to be generally similar to PTU 18B of FIG. 4 and is operable to provide a high-range and an overdrive connection between the input shaft 54 and the first differential 46. However, PTU 18C includes an epicyclic gear assembly 80C having compound planet gears 90C rotatably supported from the planet carrier 92C. Each compound planet gear 90C has a first gear portion 93 that is meshed with the sun gear 88C and a second gear portion 95 that is meshed with the ring gear 86C. It will be noted that the remainder of PTU 18C is practically identical to PTU 18B such that common reference numerals are used to identify similar components. The operation of the first range clutch 82B and the second range clutch 84B are the same as previously described to permit establishment of the high-range and overdrive drive connection between the input shaft 54 and the first differential case 48.

Figure 6:
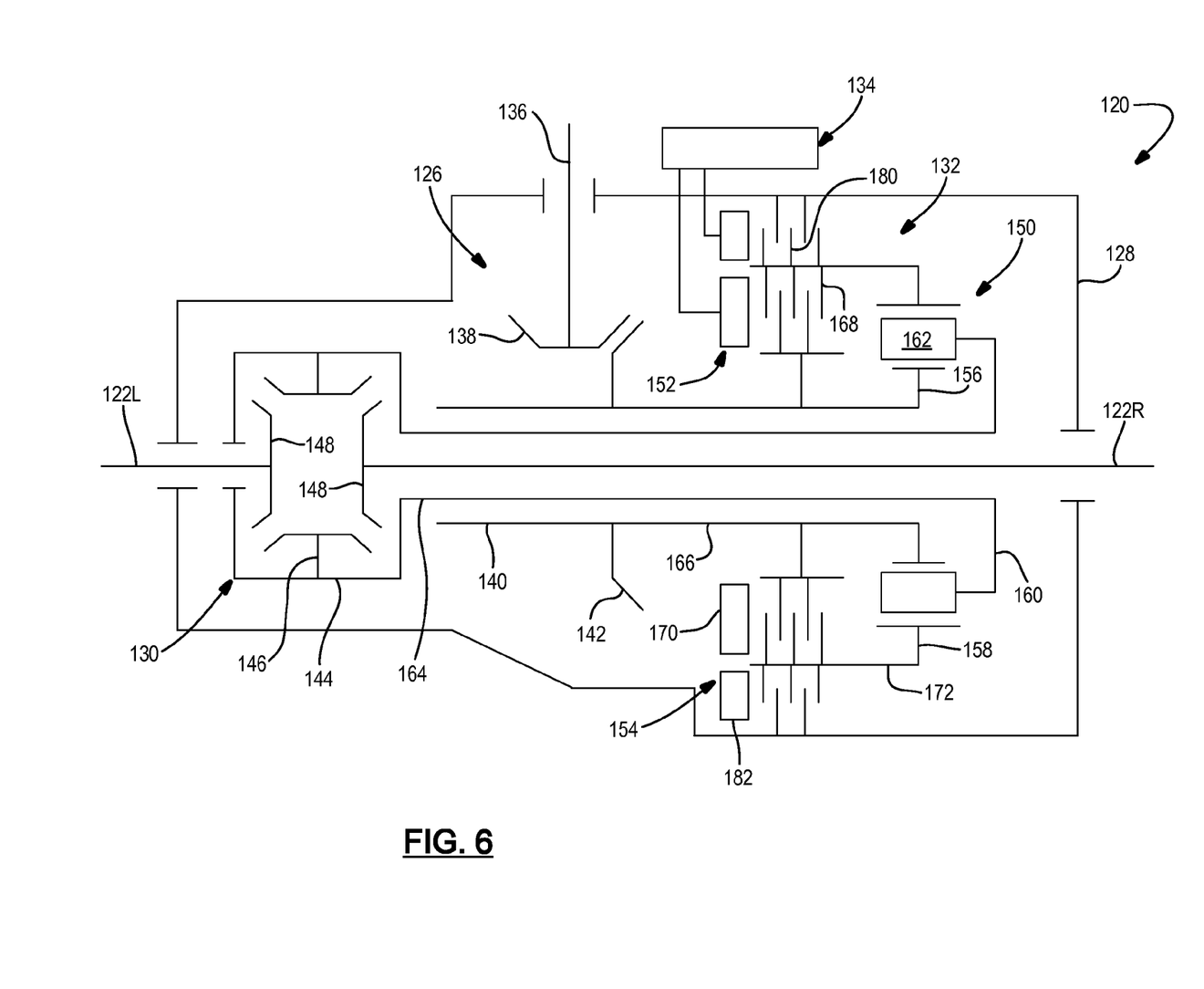
FIG. 6 is a schematic illustration of a multi-speed rear drive module associated with the disconnectable all-wheel drive system of FIG. 1.
Figure 7:
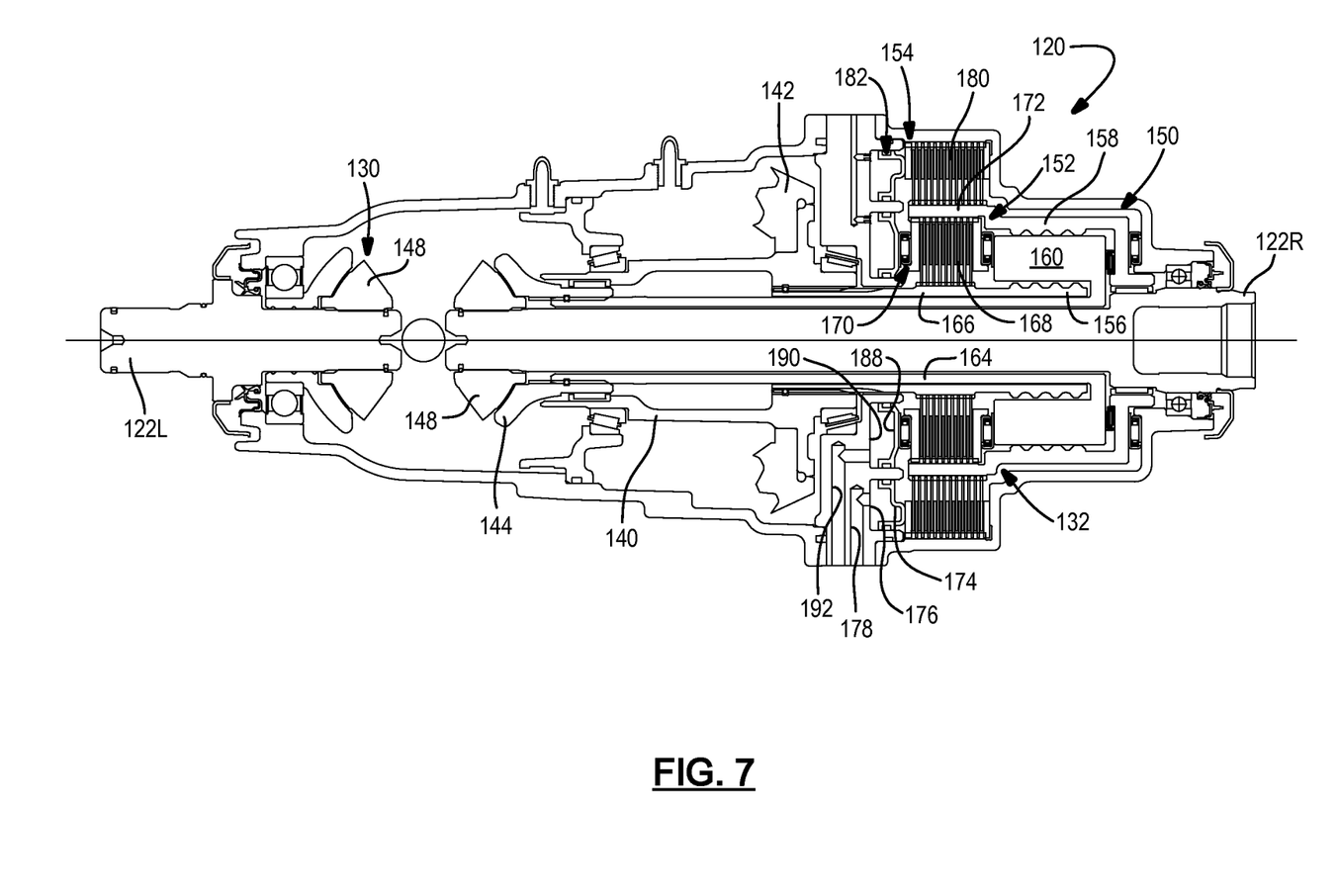
FIG. 7 is a sectional view of a multi-speed rear drive module constructed in accordance with the exemplary embodiment shown in FIG. 6.

With particular reference now to FIGS. 1, 6 and 7, the secondary driveline 20 can include the propshaft 76, a multi-speed rear drive module (RDM) 120, a pair of second axle-shafts 122L, 122R and a set of second vehicle wheels 124L, 124R. A first end of the propshaft 76 can connect the output pinion shaft 60 of the power take-off unit 18 to an input 126 of the rear drive module 120. The rear drive module 120 can include a housing 128, a second differential 130, a multi-speed range unit 132 and an actuator assembly 134. The input 126 can include an input pinion shaft 136 having a pinion gear 138, a hollow spool shaft 140, and a hypoid hear 142 that is fixed to the spool shaft 140 and meshed with the pinion gear 138. The second differential 130 can include a second differential case 144, at least one pair of second pinion gears 146 rotatably supported by the second differential case 144, and a pair of second side gears 148 that are meshed with the second pinion gears 146. The second side gears 148 are fixed for rotation with the inboard ends of the second axleshafts 122L, 122R.

The multi-speed range unit 132 is operable to establish at least two different speed ratio drive connections between the spool shaft 140 and the second differential case 144. Specifically, the multi-speed range unit 132 can include an epicyclic planetary assembly 150, a high-range torque transfer device 152, and a low-range torque transfer device 154. The planetary gear assembly 150 includes a sun gear 156, a ring gear 158, a planet carrier 160, and a plurality of planet gears 162 that are rotatably supported from the planet carrier 160 and meshed with both the sun gear 156 and the ring gear 158. The planet carrier 162 is fixed to one end of an elongated quill shaft 164 which surrounds axleshaft 122R. The opposite end of the quill shaft 164 is coupled (i.e., splined) to the second differential case 144. The sun gear 156 is formed on, or fixed to, one end of a tubular sun gear shaft 166 that surrounds the quill shaft 164. The opposite end of the sun gear shaft 166 is fixedly coupled (i.e., splined) for rotation with the spool shaft 140.

The high-range torque transfer device, hereinafter H-TTD 152, includes a friction clutch pack 168 and a H-TTD actuator 170. The friction clutch pack 168 can include alternately interleaved inner and outer friction plates coupled to the sun gear shaft 166 and a drum extension 172 extending from the ring gear 158. The H-TTD actuator 170 can include a hydraulically-operated piston 174 that is disposed in a high-range pressure chamber 176 for sliding movement relative to the clutch pack 168. A flow channel 178 communicates with the pressure chamber 176 and is supplied with pressurized fluid from the actuator assembly 134 in response to control signals from the control system 22. The H-TTD 152 is operable in a first or "released" mode when the clutch pack 168 is released to permit relative rotation between the sun gear 156 and the ring gear 158. The H-TTD 152 is also operable in a second or "engaged" mode when the clutch pack 168 is frictionally engaged by the piston 174 to inhibit relative rotation between the sun gear 156 and the ring gear 158.

The low-range torque transfer device, hereinafter L-TTD 154, includes a friction clutch pack 180 and a L-TTD actuator 182. The friction clutch pack 180 includes alternately interleaved inner and outer friction plates disposed between the ring gear extension 172 and a stationary portion 184 of a RDM housing 186. The L-TTD actuator 182 can include a hydraulic piston 188 disposed for sliding movement in a low-range pressure chamber 190 relative to the clutch pack 180. A flow channel 192 communicates with the pressure chamber 190 and is supplied with pressurized fluid from the actuator assembly 134 in response to control signals from the control system 22. The L-TTD 154 is operable in a first or "released" mode to permit rotation of the ring gear 158. The L-TTD 154 is also operable in a second or "engaged" mode when the clutch pack 180 is frictionally engaged by the piston 188 to brake or slow rotation of the ring gear 158.

Figure 8:
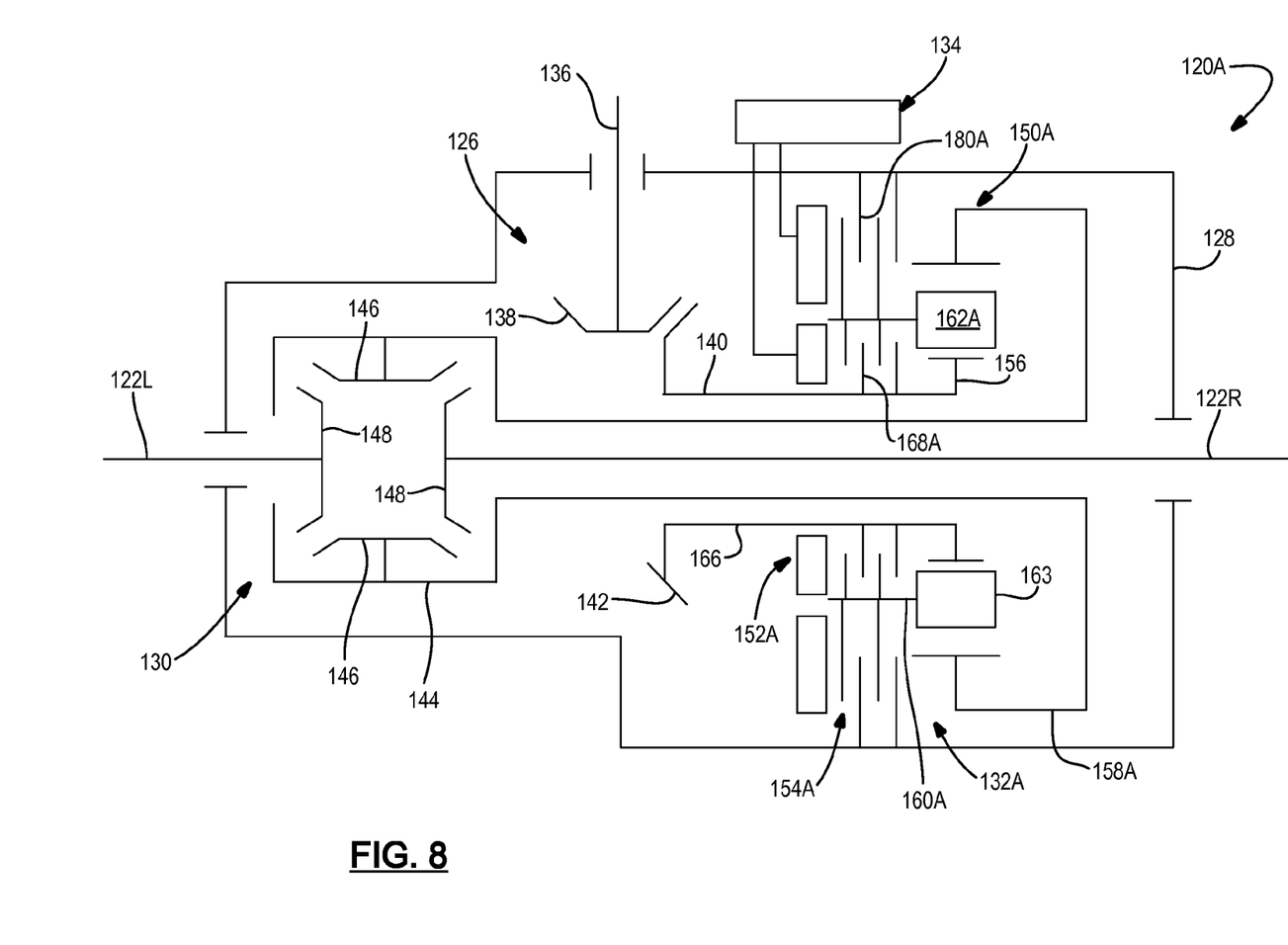
FIG. 8 is a schematic view of an alternative exemplary embodiment of a multi-speed rear drive module configured for use with the all-wheel drive system of FIG. 1.

Referring to FIG. 8, a modified version of rear drive module 120 will be described and hereinafter identified by reference number 120A. In general, rear drive module 120A is similar to rear drive module 120 with the exception that it incorporates a multi-speed range unit 132A having a different planetary gear assembly 150A. In particular, ring gear 158A is now fixed for rotation with the second differential case 144 of the second differential 130 and a set of second planet gears 163 are also supported by the planet carrier 160A. The first planet gears 162A each mesh with the sun gear 156, the second planet gears 163 each mesh with the ring gear 158A, and at least one of the first planet gears 162A also meshes with at least one of the second planet gears 163. Furthermore, the H-TTD 152A is now operably disposed between the sun gear 156 (or the sun gear shaft 166) and the planet carrier 160A. Likewise, the L-TTD 154A is now operably disposed between the planet carrier 160A and the RDM housing 128. The H-TTD 152A is operable in its first or released mode to permit relative rotation between the sun gear 156 and the planet carrier 160A and in its second or engaged mode (when the clutch pack 168A is frictionally engaged) to prevent relative rotation between the sun gear 156 and the carrier 160A. The L-TTD 154A is operable in its first or released mode to permit rotation of the planet carrier 160A and in its second or engaged mode to brake or slow rotation of the planet carrier 160A.

Figure 9:
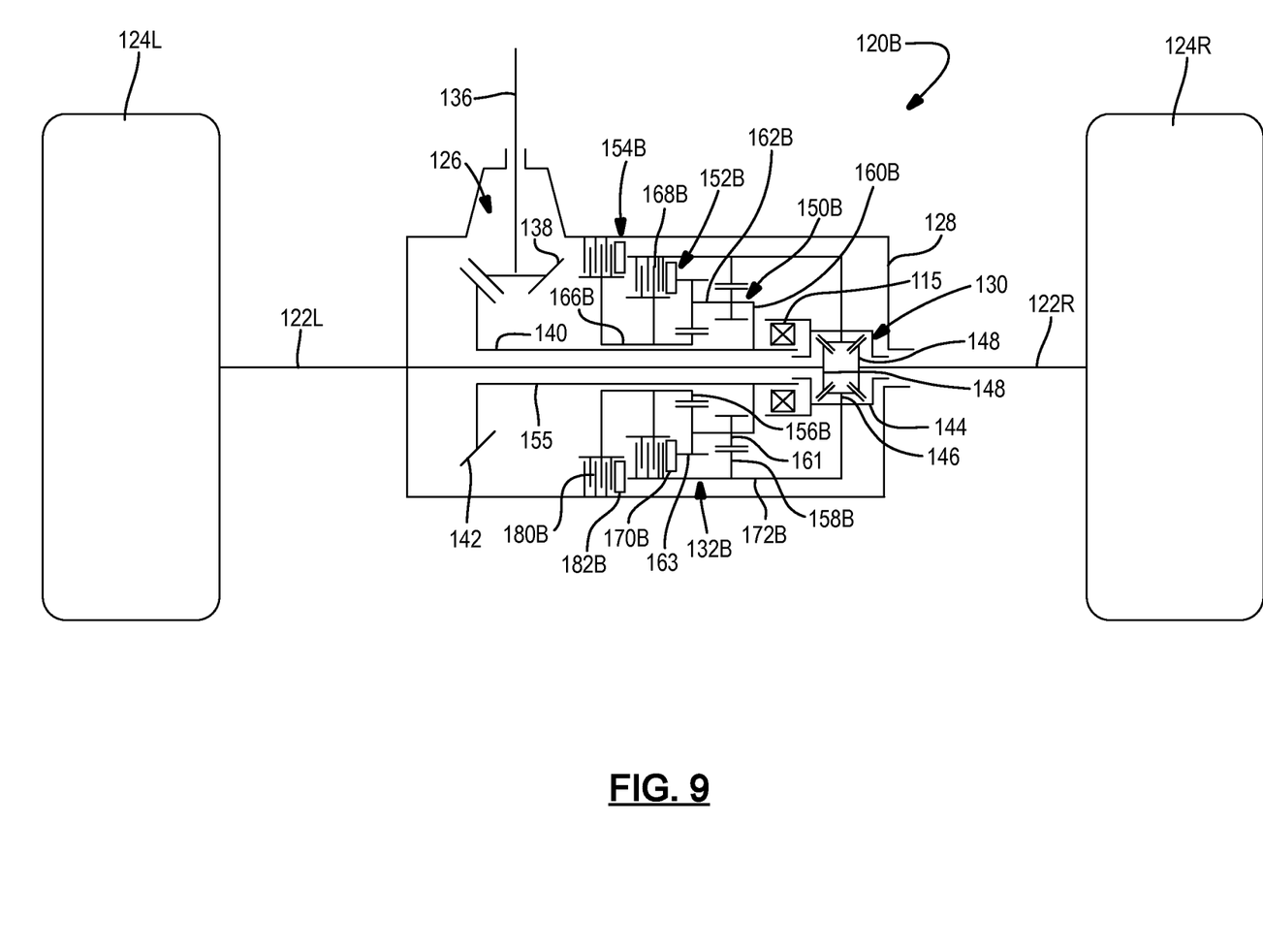
FIG. 9 is a partial schematic of another alternative exemplary embodiment of a multi-speed rear drive module.

Referring now to FIG. 9, another alternative embodiment of a rear drive module 120B is shown and which is configured to permit selection of an overdrive ratio connection between the input 126 and the second differential 130 instead of the reduction ratios previously described. The rear drive module 120B includes a multi-speed range unit 132B controlled by the actuator assembly 134. The multi-speed range unit 133B includes a planetary gear assembly 150B, a high-range TTD 152B, and an overdrive TTD 154B. The planetary gear assembly 150B includes a sun gear 156B coupled to a sun gear shaft 166B, a ring gear 158B coupled to the second differential case 144, a planet carrier 160B coupled to an input shaft 155, and a plurality of compound planet gears 162B rotatably supported by the planet carrier 160B. The input shaft 155 surrounds a portion of the second axleshaft 122L and is coupled to the spool shaft 140 so as to be driven by the RDM input 126. Thus, carrier 160B is the input component of the gear assembly 150B while the ring gear 158B is its output component. The sun gear shaft 166B is shown to surround a portion of the input shaft 155. Each of the compound planet gears 162B includes a first gear portion 163 meshed with the sun gear 156B and a second gear portion 161 meshed with the ring gear 158B. A one-way clutch 115 is shown installed between the input shaft 155 (or planet carrier 160B) and the ring gear 158B (or the second differential case 144).

The high-range TTD 152B includes a friction clutch pack 168B and a H-TTD actuator 179B. The friction clutch pack 168B is operably disposed between the sun gear shaft 166B and the drum extension 172B of the ring gear 158B. The H-TTD actuator 170B can include a piston disposed in a pressure chamber for movement relative to the clutch pack 168B. The high-range TTD 152B is operable in a first or "released" mode when the clutch pack 168B is released to permit relative rotation between the sun gear 156B and the ring gear 158B. The high-range TTD 152B is also operable in a second or "engaged" mode when the clutch pack 168B is frictionally engaged to inhibit relative rotation between the sun gear 156B and the ring gear 158B.

The overdrive TTD 154B includes a friction clutch pack 180B and an overdrive actuator 182B. The friction clutch 180B is operably disposed between the sun gear shaft 166B and RDM housing 128. The overdrive actuator 182B can include a piston slidably disposed in a pressure chamber for movement relative to the clutch pack 180B. The overdrive actuator 182B is operable in a first or "released" mode to permit rotation of the sun gear 156B and in a second or "engaged" mode to brake or slow rotation of the sun gear 156B.

A first or high-range drive connection between the input shaft 155 and the second differential case 144 is established when the high-range TTD 152B is in its second mode and the overdrive TTD 154B is operating in its first mode. In contrast, a second or overdrive connection between the input shaft 155 and the second differential case 144 is established when the high-range TTD 152B is operating in its first mode and the overdrive TTD 154B is operating in its second mode. As such, sun gear 156B is braked and the ring gear 158B is driven at an increased speed relative to the planet carrier 160B. A neutral non-driven mode is established when both the high-range TTD 152B and the overdrive TTD 154B are released.

The control system 22 is schematically shown in FIG. 1 to include a controller 200, a group of first sensors 202, and a group of second sensors 204. The group of first sensors 202 can be arranged within the motor vehicle 10 to sense a vehicle parameter and responsively generate a first sensor signal. The vehicle parameter can be associated with any combination of the following: vehicle speed, yaw rate, steering angle, engine torque, wheel speeds, shaft speeds, lateral acceleration, longitudinal acceleration, throttle position and gear position without limitations thereto. The group of second sensors 204 can be configured to sense a driver-initiated input to one or more on-board devices and/or systems within the vehicle 10 and responsively generate a second sensor signal. For example, the motor vehicle 10 may be equipped with a sensor associated with a mode selection device, such as a switch associated with a push button or a lever, that senses when the vehicle operator has selected between vehicle operation in a two-wheel drive (FWD) mode and a four-wheel or all-wheel drive (AWD) mode. Also, switched actuation of vehicular systems such as the windshield wipers, the defroster, and/or the heating system, for example, may be used by the controller 200 to assess whether the motor vehicle 10 should be shifted automatically between the FWD and AWD modes.

In operation, the vehicle 10 can normally be operated in a two-wheel high-range drive mode in which the power take-off unit 18, 18', 18A establishes a high-range drive connection between the powertrain 12 and the primary driveline 16 while the rear drive module 120, 120A is disengaged. Specifically, the disconnect mechanism 42 is operable in its disconnected mode while the first range clutch 82, 82A is normally engaged and the second range clutch 84, 84A is disengaged. Accordingly, all rotary power is transferred from the input shaft 54 to the first differential 46 for driving the first wheels 32L, 32R. In addition, the H-TTD 152, 152A and the L-TTD 154, 154A are maintained in their disengaged modes to disconnect the secondary driveline 20.

When it is desired or necessary to operate the vehicle 10 in an all-wheel high-range (AWD-H) drive mode, the control system 22 can be activated to initially signal the H-TTD actuator 170, 170A to shift the H-TTD 152, 152A into its engaged mode for synchronizing the speeds of the primary driveline 16 and the secondary driveline 20. Thereafter, a four-wheel drive connection between the powertrain 12, the primary driveline 16 and the secondary driveline 20 is established by shifting the disconnect mechanism 42 into its connected mode. Thereafter, the H-TTD actuator 170 can be controlled to vary the torque transmitted through the H-TTD 152, 152A to the second wheels 124L, 124R.

If during operation of the vehicle in its AWD-H mode, it is desired or determined that improved traction requires operation in an all-wheel low-range (AWD-L) drive mode, the control system 22 functions to coordinate shifting of power take-off unit 18, 18', 18A into its four-wheel low-range mode and rear drive module 120, 120A into its low-range mode. Specifically, in the power take-off unit 18, 18', 18A, the disconnect mechanism 42 is maintained in its connected mode while the first range clutch 82, 82A is released and the second range clutch 84, 84A is engaged. Likewise, in the rear drive module 120, 120A, the H-TTD 152, 152A is disengaged and the L-TTD 154, 154A is engaged to establish the low-range drive connection between the input shaft 166 and the second differential 130.

Finally, a towing mode for the vehicle 10 can be established by shifting the disconnect mechanism 42 into its disconnected mode and disengaging both the first range clutch 82, 82A and the second range clutch 84, 84A.

In all-wheel drive arrangements utilizing the power take-off unit 18B, 18C and the rear drive module 120B capable of establishing the overdrive mode in addition to the two-wheel and all-wheel high-range drive modes, the control system 22 would again be configured to coordinate shifting of the shiftable range clutches and disconnect mechanism in the PTU and the TTD's to establish either of a two-wheel overdrive mode (2WD-O) or an all-wheel overdrive (AWD-O) drive mode when required to meet specific traction requirements.

It is also an aspect of the present disclosure that the multi-speed range units associated with the power take-off units and the rear drive modules can be shifted while the motor vehicle is in motion, referred to as "on-the-fly" range shifting. When shifting from the all-wheel drive direct (high-range) into the all-wheel drive non-direct (reduction or overdrive), it is contemplated to: interrupt engine power; shift the PTU into neutral while disconnect mechanism is connected; apply the L-TTD or O-TTD to synchronize the drivelines; shift the PTU into its non-direct drive connection; restore the engine power; and use the L-TTD or O-TTD as a torque biasing device. When shifting from the all-wheel drive non-direct mode into the all-wheel drive direct mode, it is contemplated to: interrupt engine power; shift the PTU into neutral while the disconnect mechanism is connected; apply the H-TTD to synchronize the drivelines; restore engine power; and use the H-TTD as a torque biasing device. The drivelines can also be shifted from the 2WD into the AWD modes by: shifting the PTU into its high-range mode with the disconnect mechanism in its disconnected mode; open both RDM TTD's; actuate the H-TTD to synchronize the drivelines; shift the disconnect mechanism into its connected mode; and use the H-TTD as a torque biasing device.

The present disclosure is directed to all-wheel drive motor vehicles having a disconnectable power take-off and rear drive module to permit disconnection of various rotary components in an effort to improve fuel economy and extend the service life. In addition, multi-speed range units are incorporated into one or both of the power take-off units to permit selection of at least two different speed ratio drive connections. The multi-speed range units can be configured to provide a direct (1:1) ratio drive connection and a non-direct ratio drive connection. The non-direct ratio can be either an underdrive (i.e., reduction) ratio or an overdrive ratio depending on the desired speed ratios. It will be understood that it is preferable, but not limiting, to match the multi-speed range unit integrated into each of the power take-off and the rear drive module to provide one of the underdrive/overdrive non-direct speed ratios in addition to the direct ratio to meet the desired torque distribution requirements of a particular vehicle.

While specific aspects have been described in the specification and illustrated in the drawings, it will be understood by those skilled in the art that various changes can be made and equivalents can be substituted for elements and components thereof without departing from the scope of the present teachings, as defined in the claims. Furthermore, the mixing and matching of features, elements, components and/or functions between various aspects of the present teachings are expressly contemplated herein so that one skilled in the art will appreciate from the present teachings that features, elements, components and/or functions of one aspect of the present teachings can be incorporated into another aspect, as appropriate, unless described otherwise above. Moreover, many modifications may be made to adapt a particular situation, configuration, or material to the present teachings without departing from the essential scope thereof. Therefore, it is intended that the present teachings not be limited to the particular aspects illustrated by the drawings and described in the specification as the best mode presently contemplated for carrying out the present teachings, but that the scope of the present teachings include many aspects and examples following within the foregoing description and the appended claims.

What is claimed is:

1. An all-wheel drive system for a motor vehicle, the motor vehicle having a powertrain, a first pair of wheels and a second pair of wheels, the all-wheel drive system comprising:
   a primary driveline including a first input, a first differential, a first multi-speed range unit, and a power take-off unit, the first input being configured to be driven by the powertrain, the first differential having a first pair of differential outputs and being configured to distribute rotary power for driving the first pair of wheels, the first multi-speed range unit being operable in first and second speed ratio drive connections for transmitting rotary power between the first differential and the first input, the power take-off unit having a disconnect mechanism, which selectively couples a power take-off input member to the first input for rotation therewith, and a first output, wherein the first input and the first and second differential outputs are rotatable about a first rotary axis; and
   a secondary driveline including a second input, a second differential and a second multi-speed range unit, the second input being coupled to the power take-off unit to receive rotary power therefrom, the second differential being configured to distribute rotary power for driving the second pair of wheels;
   wherein the second multi-speed range unit is selectively operable to establish first and second speed ratio drive connections between the second input and the second differential.

2. The all-wheel drive system of claim 1, wherein the second multi-speed range unit comprises a transmission and first and second clutches that are selectively operable to control operation of the transmission.

3. The all-wheel drive system of claim 2, wherein at least one of first and second clutches comprises a multi-plate friction clutch.

4. The all-wheel drive system of claim 2, wherein the transmission is a planetary transmission.

5. The all-wheel drive system of claim 4, wherein one of the first and second clutches is selectively operable to inhibit relative rotation between at least two of a sun gear, a ring gear, a planet gear and a planet carrier.

6. The all-wheel drive system of claim 5, wherein the secondary driveline further comprises a housing into which the second input, the second differential and the second multi-speed range unit are disposed in, and wherein the other one of the first and second clutches is selectively operable to inhibit rotation between the housing and one of the ring gear, the sun gear and the planet carrier.

7. The all-wheel drive system of claim 2, wherein the first and second clutches can be selectively operated to inhibit transmission of rotary power between the second input and the second differential.

8. The all-wheel drive system of claim 2, wherein the second input comprises a pinion gear that is meshed with a ring gear, wherein the ring gear is mounted on a ring gear shaft for common rotation, wherein the first clutch has a first clutch input member, wherein the second clutch has a second clutch input member, and wherein the first and second clutch input members are coupled to a shaft that is disposed concentrically about the ring gear shaft.

9. The all-wheel drive system of claim 8, wherein the ring gear shaft is hollow and wherein an axle shaft is received through the ring gear shaft.

10. The all-wheel drive system of claim 8, wherein the second multi-speed range unit comprises a third clutch that is disposed between the ring gear shaft and a case of the second differential.

11. The all-wheel drive system of claim 10, wherein the third clutch is a one-way clutch.

12. The all-wheel drive system of claim 1, wherein the disconnect mechanism comprises a multi-plate friction clutch.

13. The all-wheel drive system of claim 1, wherein the first multi-speed range unit comprises a transmission and at least one clutch that is selectively operable to control operation of the transmission.

14. The all-wheel drive system of claim 13, wherein the at least one clutch comprises a multi-plate friction clutch.

15. The all-wheel drive system of claim 13, wherein the transmission is a planetary transmission.

16. The all-wheel drive system of claim 15, wherein the at least one clutch comprises a first clutch that is selectively operable to inhibit relative rotation between at least two of: a sun gear, a ring gear and a planet carrier.

17. The all-wheel drive system of claim 16, wherein the primary driveline further comprises a housing into which the first input, the first differential and the first multi-speed range unit are disposed in, and wherein the at least one clutch comprises a second clutch that is selectively operable to inhibit rotation between the housing and one of the ring gear, the sun gear and the planet carrier.

18. The all-wheel drive system of claim 13, wherein the first input comprises a hollow shaft member, wherein the at least one clutch comprises a first clutch and a second clutch, wherein the first clutch has a first clutch input member, wherein the second clutch has a second clutch input member, and wherein the first and second clutch input members are coupled to a shaft that is disposed concentrically about the hollow shaft member.

19. The all-wheel drive system of claim 18, wherein an axle shaft is received through the hollow shaft member.

20. The all-wheel drive system of claim 18, wherein the first multi-speed range unit comprises a third clutch that is disposed between the hollow shaft member and a case of the first differential.

21. The all-wheel drive system of claim 20, wherein the third clutch is a one-way clutch.

* * * * *